US008642228B2

(12) United States Patent
Cho et al.

(10) Patent No.: US 8,642,228 B2
(45) Date of Patent: Feb. 4, 2014

(54) POLYMER ELECTROLYTE MEMBRANE AND FUEL CELL USING THE POLYMER ELECTROLYTE MEMBRANE

(75) Inventors: Myung-dong Cho, Hwaseong-si (KR); Hee-Young Sun, Yongin-si (KR); Myung-jin Lee, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 2148 days.

(21) Appl. No.: 11/363,241

(22) Filed: Feb. 28, 2006

(65) Prior Publication Data

US 2006/0263659 A1 Nov. 23, 2006

Related U.S. Application Data

(63) Continuation-in-part of application No. 11/150,183, filed on Jun. 13, 2005, now Pat. No. 8,026,016.

(30) Foreign Application Priority Data

Aug. 31, 2004 (KR) ........................ 10-2004-0069091
Dec. 21, 2005 (KR) ........................ 10-2005-0126916

(51) Int. Cl.
*H01M 8/10* (2006.01)

(52) U.S. Cl.
USPC ......................................... 429/479; 429/492

(58) Field of Classification Search
USPC ......................................... 429/129, 309, 315
See application file for complete search history.

(56) References Cited

U.S. PATENT DOCUMENTS

| 5,096,561 | A | * | 3/1992 | Akhtar .......................... 204/296 |
| 5,451,476 | A | * | 9/1995 | Josefowicz ................... 429/213 |
| 5,985,942 | A | | 11/1999 | Steck et al. |
| 6,218,035 | B1 | * | 4/2001 | Fuglevand et al. .............. 429/30 |
| 6,258,276 | B1 | * | 7/2001 | Mika et al. ..................... 210/638 |
| 6,395,429 | B1 | * | 5/2002 | Kang et al. .................... 429/306 |
| 6,444,343 | B1 | | 9/2002 | Prakash et al. |
| 6,468,595 | B1 | | 10/2002 | Mikhael et al. |
| 7,288,309 | B2 | | 10/2007 | Fleming et al. |
| 7,344,791 | B1 | * | 3/2008 | Yamaguchi et al. ............ 429/30 |
| 2002/0045085 | A1 | * | 4/2002 | Formato et al. ................. 429/33 |
| 2002/0127474 | A1 | | 9/2002 | Fleischer et al. |

(Continued)

FOREIGN PATENT DOCUMENTS

| CN | 1114237 | 1/1996 |
| CN | 1371934 | 10/2002 |

(Continued)

OTHER PUBLICATIONS

European Search Report dated Oct. 12, 2005.

(Continued)

*Primary Examiner* — Patrick Ryan
*Assistant Examiner* — Muhammad Siddiquee
(74) *Attorney, Agent, or Firm* — H.C. Park & Associates, PLC

(57) ABSTRACT

A polymer electrolyte membrane, a method of preparing the polymer electrolyte membrane, and a fuel cell including the polymer electrolyte membrane are disclosed in which the polymer electrolyte membrane includes a porous polymer matrix, and an ionic conductive polymer layer coated on the external surfaces of single fibers and inside pores of the porous polymer matrix.

9 Claims, 3 Drawing Sheets

(56) References Cited

U.S. PATENT DOCUMENTS

| | | |
|---|---|---|
| 2002/0144899 A1 | 10/2002 | Arcella et al. |
| 2002/0156142 A1 | 10/2002 | Mikhael et al. |
| 2003/0168404 A1 | 9/2003 | Mika et al. |
| 2005/0003255 A1* | 1/2005 | Shimizu et al. .............. 429/30 |
| 2009/0297909 A1 | 12/2009 | Yamamoto et al. |

FOREIGN PATENT DOCUMENTS

| | | |
|---|---|---|
| CN | 101069313 | 11/2007 |
| EP | 1 238 999 A1 | 9/2002 |
| JP | 11-503262 | 3/1999 |
| JP | 2002-008680 | 1/2002 |
| JP | 2002-083514 | 3/2002 |
| JP | 2004-014232 | 1/2004 |
| JP | 2004-055165 | 2/2004 |
| JP | 2004-063430 | 2/2004 |
| JP | 2004-146279 | 5/2004 |
| JP | 2004-149779 | 5/2004 |
| JP | 2004-253336 | 9/2004 |
| KR | 10-2003-0038232 | 5/2003 |
| KR | 10-2004-0104842 | 12/2004 |
| WO | 01/60873 | 8/2001 |
| WO | 02/064268 | 8/2002 |

OTHER PUBLICATIONS

Office Action issued Sep. 11, 2009 by the State Intellectual Property Office of the People's Republic of China in Chinese Patent Application No. 2006100549688.

Office Action dated Jul. 31, 2009 for co-pending U.S. Appl. No. 11/150,183.

Japanese Office Action dated Jun. 23, 2009.

Final Office Action issued Jan. 21, 2010 in U.S. Appl. No. 11/150,183.

The Third Office Action issued Jan. 8, 2010 by the Patent Office of the People's Republic of China in Chinese Application No. 2006100549688.

Non-Final Office Action of U.S. Appl. No. 11/150,183 dated on Jun. 10, 2010.

Registration Determination Certificate for Chinese Patent No. 200510059038.7 issued on Aug. 6, 2008, corresponding to U.S. Appl. No. 11/363,241 and U.S. Appl. No. 11/150,183.

Registration Determination Certificate for Chinese Patent No. 200610054968 issued on Dec. 29, 2010, corresponding to U.S. Appl. No. 11/363,241 and U.S. Appl. No. 11/150,183.

Notice of Allowance of U.S. Appl. No. 11/150,183 issued on Jun. 1, 2011.

Notice of Allowance of Nov. 29, 2010 in U.S. Appl. No. 11/150,183.

* cited by examiner

POLYMER ELECTROLYTE MEMBRANE AND FUEL CELL USING THE POLYMER ELECTROLYTE MEMBRANE

CROSS-REFERENCE TO RELATED APPLICATIONS

This application is a Continuation-in-Part of U.S. patent application Ser. No. 11/150,183 filed Jun. 13, 2005 and claims priority to and the benefit of Korean Patent Application No. 10-2004-0069091, filed on Aug. 31, 2004, and Korean Patent Application No. 10-2005-0126916, filed on Dec. 21, 2005, which are hereby incorporated by reference for all purposes as if fully set forth herein.

BACKGROUND OF THE INVENTION

1. Field of the Invention

The present invention relates to a polymer electrolyte membrane and a fuel cell using the same. In particular, the present invention relates to a polymer electrolyte membrane that has excellent thermal properties and mechanical stability, and a fuel cell employing the same.

2. Discussion of the Background

A fuel cell is a device that generates electricity by a chemical reaction between fuel and oxygen. A fuel cell can be used to provide electric power in small electronic products such as portable devices as well as to provide electric power for industrial, household, and automotive use.

Fuel cells can be classified into categories based on the type of the electrolyte to be used, including polymer electrolyte membrane fuel cell (PEMFC), phosphoric acid fuel cell (PAFC), molten carbonate fuel cell (MCFC), and solid oxide fuel cell (SOFC), etc. The operating temperature of the fuel cell and the composition of its components vary depending on the type of electrolyte to be used.

Fuel cells can be classified based on the method of supplying fuel. These categories include an exterior reforming type that converts a fuel to a hydrogen enriched gas through a fuel reformer, a direct fuel feeding type that directly supplies a fuel in a gas or a liquid state to an anode, or an interior reforming type.

An example of the direct fuel feeding type is a direct methanol fuel cell (DMFC). In general, the DMFC uses an aqueous methanol solution as a fuel, and a hydrogen ion conducting polymer electrolyte membrane as an electrolyte. Accordingly, the DMFC is a type of PEMFC.

Although PEMFCs are small and lightweight, they can provide high output density. Furthermore, by using the PEMFC, a system for generating electricity becomes simple to construct.

A PEMFC typically comprises an anode (fuel electrode), a cathode (oxidant electrode), and a polymer electrolyte membrane placed between the anode and the cathode. The anode of the PEMFC is provided with a catalyst layer to promote oxidation of a fuel, and the cathode of the PEMFC is provided with a catalyst layer to promote reduction of the oxidant.

The fuel that is supplied to the anode of a PEMFC typically includes hydrogen, hydrogen-containing gas, mixed vapor of steam and methanol, and aqueous methanol solution, etc. The oxidant that is supplied to the cathode of the PEMFC typically includes oxygen, oxygen-containing gas or air.

A fuel is oxidized to form a hydrogen ion and an electron at the anode of the PEMFC. The hydrogen ion is transferred to the cathode through an electrolyte membrane, and the electron is transferred to an outer circuit (load) through a wire (or a collector). At the cathode of the PEMFC, the hydrogen ion transferred through the electrolyte membrane, the electron transferred from the outer circuit through a wire (or a collector), and oxygen are combined to form water. The flow of the electron through the anode, the outer circuit, and the cathode is electricity.

In the PEMFC, the polymer electrolyte membrane plays not only a role as an ion conductor to transfer hydrogen ions from the anode to cathode, but also a role as a separator to block the physical contact of the anode and the cathode. Accordingly, the properties required for the polymer electrolyte membrane are excellent ion conductivity, electrochemical stability, strong mechanical strength, thermal stability at operating temperature, easy thin film making, etc.

The material of the polymer electrolyte membrane generally includes a polymer electrolyte such as a sulfonate perfluorinated polymer such as Nafion® that has a backbone consisting of a fluorinated alkylene, and a side chain that consists of a fluorinated vinyl ether that has a sulfonic acid group at the terminal end. Such a polymer electrolyte membrane contains a sufficient quantity of water and thus shows excellent ion conductivity.

However, when operating a PEMFC at an operating temperature higher than 100° C., such an electrolyte membrane loses its function since its ion conductivity seriously declines due to the loss of water by evaporation. This problem makes it almost impossible to operate the PEMFC using such a polymer electrolyte membrane at atmospheric pressure and a temperature higher than 100° C. Thus, existing PEMFCs have been operated at a temperature lower than 100° C., for example at about 80° C.

Methods to increase the operating temperature of the PEMFC to a temperature of 100° C. or higher including mounting a humidifying apparatus on the PEMFC, operating the PEMFC at pressurized condition, and using a polymer electrolyte that does not require humidification have been suggested.

When the PEMFC is operated under pressurized conditions, the operating temperature can be elevated since the boiling point of water is elevated. For example, when the operating pressure of the PEMFC is 2 atm, the operating temperature can be elevated to about 120° C. However, when a pressurizing system is applied or a humidifying apparatus is mounted to the device, not only do the size and weight of the PEMFC increase, but the total efficiency of the generating system decreases. Accordingly, in order to maximize the application range of the PEMFC, the "non-humidified polymer electrolyte membrane" which is a polymer electrolyte membrane that provides excellent ion conductivity without humidification, is needed.

An example of a non-humidified polymer electrolyte membrane is disclosed in Japanese Patent Publication No. 1999-503262. In this patent, several materials, such as polybenzoimidazole, sulphuric acid or phosphoric acid doped polybenzoimidazole, etc. are described as a non-humidified polymer electrolyte.

SUMMARY OF THE INVENTION

The present invention provides a polymer electrolyte membrane that has stability at a high temperature, excellent mechanical strength, and excellent ion conductivity even at non-humidified state.

The present invention also provides a method of fabricating the same.

The present invention also provides a fuel cell that employs the polymer electrolyte membrane to improve cell performance.

Additional features of the invention will be set forth in the description which follows, and in part will be apparent from the description, or may be learned by practice of the invention.

The present invention discloses a polymer electrolyte membrane including a porous polymer matrix; and a polymer coating that conducts ions formed on the outer faces of single fibers and inside pores of the porous polymer matrix.

The present invention also discloses a method of preparing a polymer electrolyte membrane, including coating a porous polymer matrix with a composition including an ion conducting polymeric compound and a cross-linking agent in a vacuum using a fine-particle coating method; and polymerizing the resulting structure to obtain a polymer electrolyte membrane including an ionic conductive polymer coated layer formed on the external surfaces of single fibers and inside pores of the porous polymer matrix.

The present invention also discloses a fuel cell that includes a cathode; an anode; and the polymer electrolyte membrane of claim 1 interposed between the cathode and the anode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
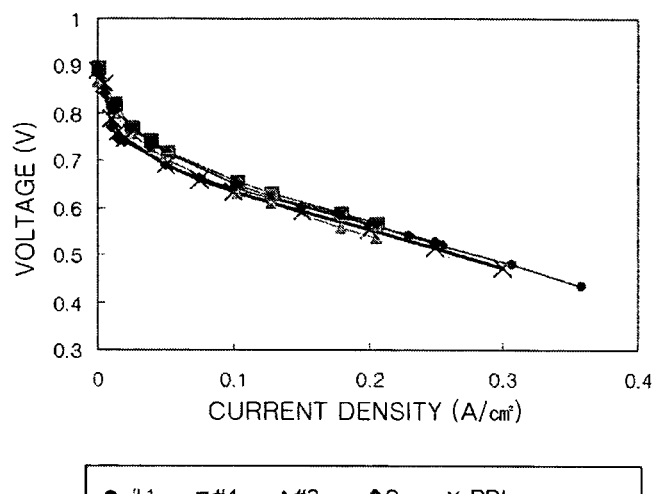
FIG. 1 is a graph illustrating the results of a cell performance analysis on fuel cells manufactured according to Examples 1 through 4.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A polymer electrolyte membrane according to an exemplary embodiment of the present invention may include a porous polymer matrix with excellent mechanical strength and thermal characteristics. The polymer electrolyte membrane may include an ionic conducive polymer coated layer obtained by grafting or cross-linking an ionic conductive polymerizable compound to the external surfaces of single fibers (individual fibers) or to single fibers inside pores of the polymer matrix. The ionic conductive polymerizable compound may include various types of ionic conductive groups, such as proton conductive groups. Pores may exist in the polymer matrix depending on a degree of coating the ionic conductive polymer.

The term "polymer electrolyte membrane" herein refers to an ionic conductor that includes a polymer electrolyte matrix into which an ion medium is impregnated.

The term "ionic medium" herein refers to a coated monomer (Nafion®) used in a DMFC, to a phosphoric acid in a phosphoric acid fuel cell, and to an alkali metal ion such as Li, Na or K in ionic rechargeable battery systems.

The term "single fiber" herein refers to a single fiber or thread in web form that has a three dimensional structure and is formed in pores of the porous polymer matrix. In other words, it refers to individual fibers or thread chains constituting the polymer matrix.

The polymer electrolyte membrane may be especially useful as a non-humidified polymer electrolyte membrane. The polymer electrolyte membrane may be obtained by coating an ionic conductive polymer on a porous polymer matrix which is thermally durable at 200° C. or higher and has excellent mechanical and thermal stability.

The term "non-humidified polymer electrolyte membrane" refers to a polymer electrolyte membrane that exhibits excellent ionic conductivity even under non-humidified conditions, and which can maintain an ionic conductivity of $10^{-2}$ S/cm or more at 100° C. and atmospheric pressure.

The ion conductive polymer may be formed by the polymerisation of a composition containing an ionic conductive polymerizable compound and a cross-linking agent.

The ionic conductive polymerizable compound may include an acidic group, such as a sulfonic acid group, a phosphoric acid group, or a carboxyl group, a basic group, such as pyridine, pyrrolidone, imine, or imidazole, or an ionic conductive functional group, such as an imide group, a sulfone imide group, a sulphonamide group, a hydroxy group, or a hydroxy group at its terminal group. The ionic conductive polymerizable compound may include a polymerizable bond, for example, an unsaturated bond, such as a double bond, or a functional group, such as an epoxy group, at its head portion.

The weight average molecular weight of the ionic conductive polymerizable compound may be less than about 10,000 g/mole, preferably about 100 to 10,000 g/mole, and more preferably, about 50 to 2,000 g/mole. When the weight average molecular weight exceeds about 10,000 g/mole, the ionic conductivity of the conductive polymerizable compound deteriorates.

The ionic conductive polymerizable compound may include at least one of vinyl sulfonic acid, styrene sulfonic acid, sulfonyl acrylate, an acrylic resin having an acidic functional group at its terminal, alkylamine, and a vinyl monomer having a basic functional group at its terminal. Examples of acrylic resin having an ionic conductive acidic functional group include phosphoric monoacrylate, phosphoric diacrylate, and a mixture thereof. Examples of alkylamine include acrylic acid 2-(tert-butyl-methyl-amino)-ethyl ester, N-tert-butyldiethanolamine, N-(1-cyanocyclohexyl)-N-methylbutyramide, and a mixture thereof Examples of vinyl monomer having a basic functional group at its terminal include vinylpyridine, vinylpyrrolidone, poly(ethyleneimine), 1-vinyl imidazole, and a mixture thereof.

Basic compounds, such as vinylpyridine, vinylpyrrolidone, and poly(ethylene imine) may increase hydrophilicity and enhance compatibility with phosphoric acid when binding to polymers constituting the polymer matrix, thereby improving phosphoric acid retention capacity.

The phosphoric acid retention capacity of such basic compounds is greater than the phosphoric acid retention capacity of compounds having an acid group, such as a sulfonic carboxylic acid group.

The cross-linking agent may improve the mechanical properties of the polymer electrolyte membrane. The cross-linking agent may include at least one of hexyl acrylate, butyl acrylate, trimethylolpropane triacrylate (TMPTA), poly(ethylene glycol) methacrylate (PEGMA, $H_2C=C(CH_3)-C(=O)-(OCH_2CH_2)_n-OH$, where n is an integer of from 1 to 25), poly(ethylene glycol) dimethacrylate (PEDMA, $H_2C=C(CH_3)-C(=O)-(OCH_2CH_2)_n-OC(=O)-C(CH_3)=CH_2$, where n is an integer of from 1 to 25), allylacrylate, and divinylbenzene.

The concentration of the cross-linking agent may be about 25 to 300 parts by weight based on 100 parts by weight of the ionic conductive polymerizable compound. When the concentration of the cross-linking agent is less than about 25 parts by weight, the cross-linking effect is negligible. When the concentration of the cross-linking agent exceeds about 300 parts by weight, the polymers in the polymer matrix may excessively cross-link together and lower conductivity by hindering the migration of protons.

The composition containing the ionic conductive polymerizable compound and the cross-linking agent may further comprise a plasticizer to increase the flexibility of the polymer electrolyte membrane. The plasticizer may be, for example, poly(ethylene glycol) methyl ether acrylate $(CH_2=CH-C(=O)O-(CH_2CH_2O)_m-CH_3$, where m is an integer of from 1 to 25, or polyarylether ($CH_2=CH-(CH_2CH_2O)_m-CH_3$, where m is an integer of from 1 to 25).

The concentration of the plasticizer may be about 20 to 200 parts by weight based on 100 parts by weight of the ionic conductive polymerizable compound. When the concentration of the plasticizer is less than about 20 parts by weight, the effect of adding the plasticizer may be negligible. When the concentration of the plasticizer exceeds about 200 parts by weight, the mechanical properties of the polymer electrolyte membrane may deteriorate.

The porous polymer matrix of the polymer electrolyte membrane according to an exemplary embodiment of the present invention may be a non-woven fabric formed of at least one of polytetrafluroethylene (PTFE), polyvinylidene fluoride (PVDF), polypropylene (PP), and polyethylene (PE). The porous polymer matrix may be about 10-150 μm thick and have a porosity of about 30 to 90%, preferably about 40 to 80%. When the porosity is less than about 30%, the coating amount of ionomer decreases, which may lower conductivity. When the porosity exceeds about 90%, the conductivity may improve, but the mechanical properties of the polymer electrolyte may deteriorate.

A porous polymer matrix made of PTFE may be useful in a polymer electrolyte membrane fuel cell that is operated at high temperatures. A polymer electrolyte membrane containing a hydrophobic porous polymer matrix made of, for example, polyvinylidene (PVDF) or polypropylene (PP) may be useful in a direct methanol fuel cell to reduce methanol crossover.

The ionic conductive polymer coated layer on the external surfaces of single fibers may be about 1 to 10 μm thick, and preferably, may be about 1 to 3 μm thick. When the ionic conductive polymer coated layer is less than about 1 μm thick, the coating amount of ionomer may be insufficient, and the ionic conductivity may decrease. When the ionic conductive polymer coated layer exceeds about 10 μm thick, the ionic conductive polymer coated, layer may blocks pore, thereby deteriorating conductivity.

Hereinafter, a method of preparing a polymer electrolyte membrane according to an exemplary embodiment of the present invention will be described.

A porous polymer matrix may be coated with a composition containing an ionic conductive polymerizable compound and a cross-linking agent using fine-particle coating. Any fine-particle coating method may be used, for example, a flash evaporation method. The composition may be coated on one surface or on two opposite surfaces of the porous polymer matrix.

A coating method that employs flash evaporation will be given in more detail as follows.

A monomer is sublimated at a high temperature under ultra low pressure and is sprayed on a substrate to coat the surface and its pores. The thickness of the coated membrane is controlled by controlling the quantity of the mixed monomers. This coating method is disclosed in U.S. Pat. No. 6,468,595, the disclosure of which is incorporated herein for the reference. The present invention uses this coating method.

After coating the substrate with the microparticles as described above, the composition is polymerized to obtain a polymer electrolyte membrane in which a coating membrane made of an ion-conducting polymer is formed on the outer surface of single fibers in the porous polymer matrix. The microparticle coating method, although not particularly limited to any method, may include vacuum deposition.

The polymerization reaction can be achieved by applying light, heat, or an electron beam. UV (ultraviolet) radiation may be applied as the light treatment, and a temperature of about 70 to 350° C. may be employed for the heat treatment. The polymerization reaction may include a cross-linking reaction of an ion conducting polymeric compound and a cross-linking agent and a grafting reaction, etc. which forms a corresponding ion conducting polymer. As described above, the composition may further include a plasticizer.

By providing a cathode, an anode, and the above-described polymer electrolyte membrane interposed between the cathode and the anode, the fuel cell according to the present invention can be obtained.

The present invention will be described in more detail with reference to the following examples. The following examples are for illustrative purposes and are not intended to limit the scope of the invention.

Examples 1 Through 4

Ionic conductive polymerizable compounds were prepared by selecting varying amounts of components selected from among vinylpyridine ($CH_2=CH-C_5H_4N$), diacrylate ($H_2C=C(CH_3)-C(=O)-(OCH_2CH_2)_n-OC(=O)-C(CH_3)=CH_2$, where n is an integer of from 1 to 25, and an acrylate secondary amine (acrylic acid 2-(tert-butyl-methyl-amino)-ethyl ester ($CH_2=CH-COO-C_2H_4N(CH_3)_n-(CH_3)_3$), and TMPTA according to Table 1. Each compound was coated on a polyvinylidene fluoride (PVDF) matrix, a polytetrafluroethylene (PTFE) matrix, or a Celgard matrix (polyethylene matrix) using flash evaporation and irradiated by UV light for 10 minutes to induce an in-situ polymerization reaction at 10 kV, 100 mA e-beam and form a polymer coated layer 5 μm thick. The polymer coated layers were composed of the product of the polymerisation of vinylpyridine ($CH_2=CH-C_5H_4N$) and diacrylate, which are proton conductive polymers, on the single fibers of the PVDF matrix. The polymer electrolyte membranes produced were 23 μm thick. The polymer electrolyte membranes were impregnated with an 85% phosphoric acid aqueous solution for 2 hours.

An EFCG-S type electrode (available from E-TEK Co.) obtained by loading 10% by weight of platinum (Pt) into a Toray carbon paper (TGPH9000) to an amount of 0.6 mg/cm$^2$ was used as an electrode. The electrode was wetted with a phosphoric acid to impregnate the electrode with the phosphoric acid. The electrode was stored at 120° C. under vacuum for 1 hour.

A fuel cell was manufactured using the electrode and each of the polymer electrolyte membranes.

TABLE 1

| No. | vinylpyridine | diacrylate | acrylate secondary amine | TMPTA(parts |
|---|---|---|---|---|
| Example 1 | 25 | 25 | — | 50 |
| Example 2 | — | — | 50 | 50 |
| Example 3 | 25 | — | 25 | 50 |
| Example 4 | 50 | — | — | 50 |

The cell performance of each of the fuel cells of Examples 1 through 4 was measured and the results are shown in FIG. 1. FIG. 1 also includes data labelled PBI, which represents a fuel cell in which a polyvinyl benzimidazole membrane was used as the polymer electrolyte membrane. The cell performance was measured by measuring a change in cell potential with respect to current density at a hydrogen gas flow rate of about 100 mL/min, an air flow rate of about 300 mL/min, and a non-humidified condition.

FIG. 1 shows that the cell performances of the fuel cells of Examples 1 through 4 were equal or superior to the fuel cell using the PBI membrane.

Figure 2:
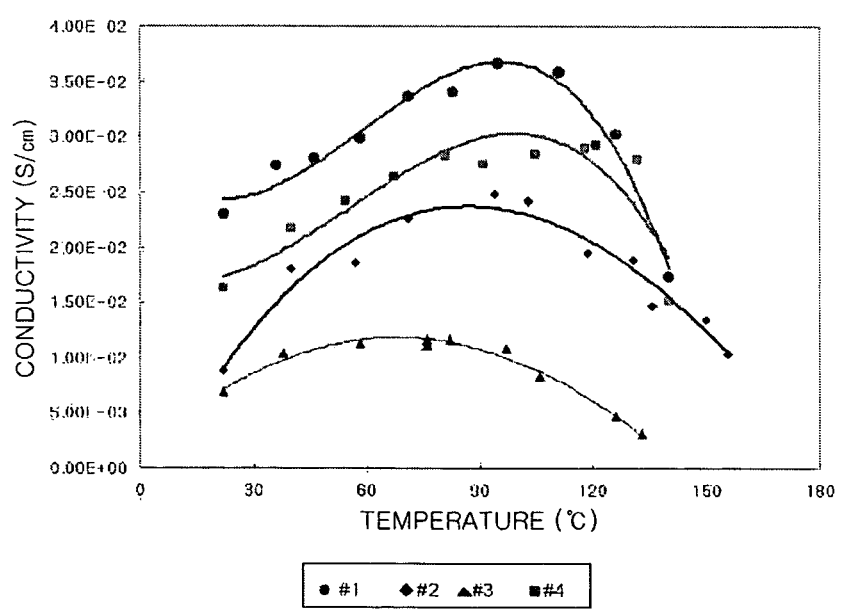
FIG. 2 is a graph illustrating the results of measuring the ionic conductivities of the polymer electrolyte membranes manufactured according to Examples 1 through 4.

The ionic conductivity of each of the polymer electrolyte membranes manufactured in Examples 1 through 4 was measured and the results are shown in FIG. 2. The ionic conductivity was measured using an AC impedance method.

FIG. 2 shows that the ionic conductivity of the polymer electrolyte membrane of Example 1 greatest, and the ionic conductivity of the polymer electrolyte membrane of Example 3 containing the secondary amine and vinylpyridine is less than the ionic conductivities of the polymer electrolyte membranes of Examples 2 and 4 in which the secondary amine and vinylpyridine were used, respectively.

Example 5

A polymer electrolyte membrane and a fuel cell were manufactured in the same manner as in Example 1, except that 10-50 parts by weight of vinyl sulfonic acid, a monomer containing sulfonic acid groups, was used as the ionic conductive polymerizable compound. The polymer electrolyte membrane was 23 μm thick, including a 5 μm thick ionic conductive coated layer.

The phosphoric acid retention capacity of the polymer electrolyte membranes of Examples 2, 4, and 5 was measured and the results are shown in Table 2. The phosphoric acid retention capacity was measured by measuring a change in the weight of the polymer electrolyte membrane after the polymer electrolyte membrane was impregnated with phosphoric acid.

TABLE 2

| Example No. | Ionic Conductive Polymerizable Compound | Phosphoric Acid Retention Capacity (%) | | | |
|---|---|---|---|---|---|
| | | 25 | 80 | 100 | 150 |
| Example 5 | Vinyl sulfonic acid | 30 | 45 | 70 | 60 |
| Example 4 | Vinylpyridine | 40 | 60 | 78 | 70 |
| Example 2 | Acrylic acid 2-(tert-butyl-methyl-amino)-ethyl ester | 49 | 63 | 82 | 75 |

Table 2 shows that the polymer electrolyte membranes including vinylpyridine and amine have greater phosphoric acid retention capacities than the polymer electrolyte membrane manufactured using a compound containing an acidic group, such as sulfonic acid group.

Figure 3:
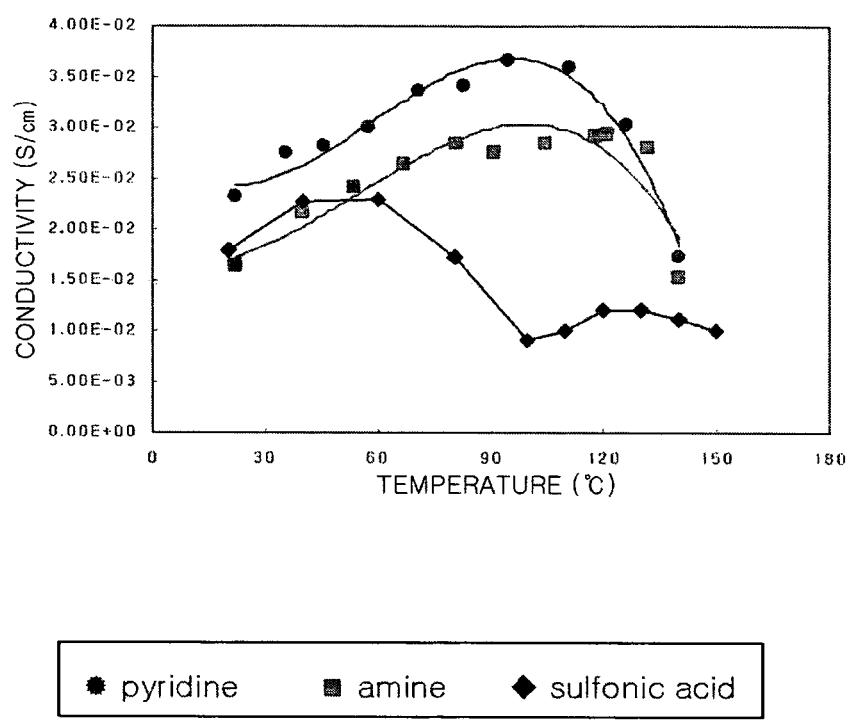
FIG. 3 is a graph illustrating the results of analyzing conductivity characteristics of the polymer electrolyte membranes manufactured according to Examples 2, 4, and 5.

The ionic conductivity of each of the polymer electrolyte membranes manufactured in Examples 2, 4, and 5 was measured and the results are shown in FIG. 3.

FIG. 3 shows that the polymer electrolyte membrane including a monomer having amine groups has a higher ionic conductivity than the polymer electrolyte membrane including a monomer having sulfonic acid groups. The polymer electrolyte membrane containing amine groups has a greater phosphoric acid retention capacity and a higher ionic conductivity.

The polymer electrolyte membranes of Examples 3 and 5 were swelled using phosphoric acid. The phosphoric acid was removed from the surface of each of the polymer electrolyte membranes, and the surfaces of the polymer electrolyte membranes were observed using a scanning electron microscope (SEM). The resulting SEM photographs are shown in FIG. 4 and FIG. 5.

Figure 4:
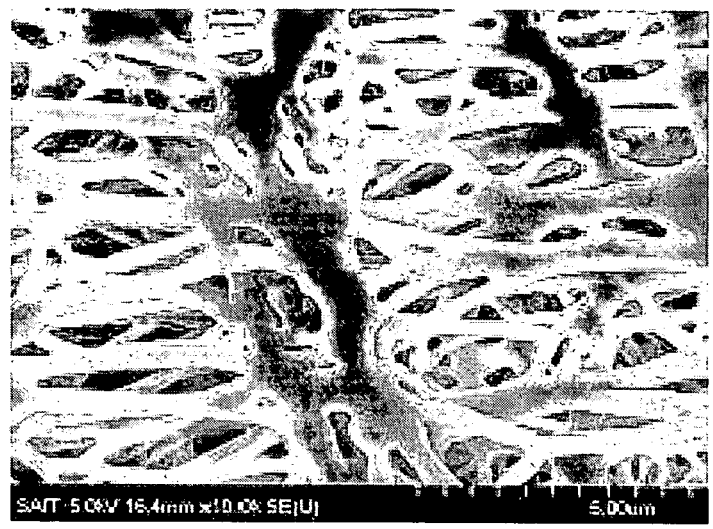
FIG. 4 and FIG. 5 are scanning electron microscopic (SEM) photographs of the polymer electrolyte membranes manufactured according to Examples 3 and 5 after being swelled using phosphoric acid and the phosphoric acid is removed from their surface.
Figure 5:
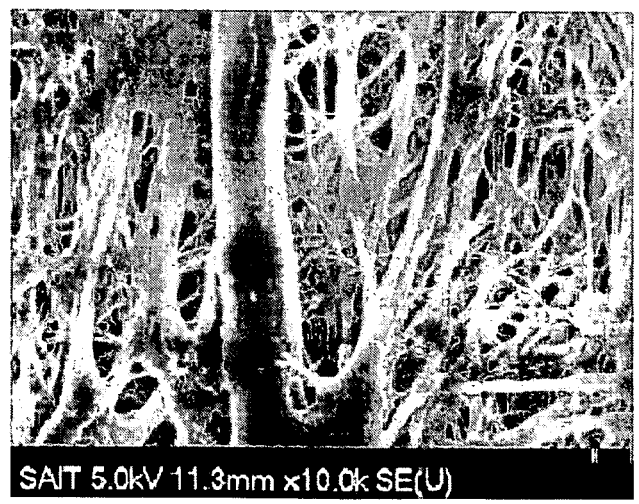

FIG. 4 and FIG. 5 are 10,000×-SEM photographs of the polymer electrolyte membranes of Examples 3 and 5, respectively. Referring to FIG. 4 and FIG. 5, the ionic conductive polymer coated layer formed on the external surfaces of single fibers constituting a PTFE matrix may be seen. Pores still exist in the matrix after the single fibers of the porous polymer matrix have been coated, which indicates that the polymer is coated 3-dimensionally, and not only on the surface of the matrix. As a result, coated ionomers in the matrix may swell and provide a path for protons while blocking gas. FIG. 4 and FIG. 5 show that the polymer electrolyte membrane of Example 3 swells more than the polymer electrolyte membrane of Example 5, which indicates that the phosphoric acid retention capacity of the polymer electrolyte membrane of Example 3 is greater than that of the polymer electrolyte membrane of Example 5.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A polymer electrolyte membrane, comprising:
a porous polymer matrix; and
a polymer coating that conducts ions arranged on the outer faces of single fibers and inside pores of the porous polymer matrix,
wherein the polymer coating is obtained by polymerizing an ion conducting polymeric compound and a cross-linking agent,
wherein the ion conducting polymeric compound comprises at least one of an acrylic resin having an acidic functional group at its terminal, alkylamine, and a vinyl monomer having a basic functional group at its terminal, wherein the acrylic resin having an acidic functional group is at least one of phosphoric monoacrylate and phosphoric diacrylate, wherein the alkylamine is at least one of acrylic acid 2-(tert-butyl-methyl-amino)-ethyl ester, N-tert-butyldiethanolamine, and N-(1-cyanocyclohexyl)-N-methyl-butyramide, and wherein the vinyl monomer having a basic functional group at its terminal is at least one of vinylpyrrolidone and 1-vinyl imidazole.

2. The polymer electrolyte membrane of claim 1, wherein the ion conducting polymeric compound has a weight average molecular weight of about 10,000 g/mole or less.

3. The polymer electrolyte membrane of claim 1, wherein the cross-linking agent is at least one selected from the group consisting of hexyl acrylate, butyl acrylate, trimethylolpropane triacrylate (TMPTA), poly(ethylene glycol) methacrylate, allylacrylate, and divinylbenzene.

4. The polymer electrolyte membrane of claim 1, wherein the polymer coating is obtained by coating the external surfaces of single fibers and inside pores of the porous polymer matrix with fine particles of a composition comprising an ion conducting polymeric compound and a cross-linking agent, and polymerizing the composition.

5. The polymer electrolyte membrane of claim 4, wherein the composition further comprises a plasticizer.

6. The polymer electrolyte membrane of claim 5, wherein the plasticizer is at least one of poly(ethylene glycol) methyl ether acrylate and polyarylether.

7. The polymer electrolyte membrane of claim 1, wherein the porous polymer matrix is a non-woven fabric comprising at least one polymer selected from the group consisting of polytetrafluoroethylene, polyvinylidene fluoride, polypropylene, and polyethylene.

8. The polymer electrolyte membrane of claim 1, wherein the porous polymer matrix is about 10-150 μm thick, and has a porosity of about 30 to 90%.

9. The polymer electrolyte membrane of claim 1, wherein the polymer coating is about 1-10 μm thick.

* * * * *